(12) United States Patent
Blackwell et al.

(10) Patent No.: US 6,241,220 B1
(45) Date of Patent: Jun. 5, 2001

(54) APPARATUS AND PROCESS FOR PRODUCING POLYMERIC FOAM

(75) Inventors: James Brian Blackwell, Prestbury; Geoffrey Buckley, Oldham; John James Blackwell, Poynton; Stephen William Blackwell, Macclesfield, all of (GB)

(73) Assignee: Beamech Group Limited, Trafford Park (GB)

( * ) Notice: Subject to any disclaimer, the term of this patent is extended or adjusted under 35 U.S.C. 154(b) by 0 days.

(21) Appl. No.: 09/341,447

(22) PCT Filed: Jan. 9, 1998

(86) PCT No.: PCT/GB98/00067

§ 371 Date: Jul. 9, 1999

§ 102(e) Date: Jul. 9, 1999

(87) PCT Pub. No.: WO98/30376

PCT Pub. Date: Jul. 16, 1998

(30) Foreign Application Priority Data

Jan. 10, 1997 (GB) .................................. 9700454
Jan. 29, 1997 (GB) .................................. 9701820

(51) Int. Cl.[7] .................................. B29C 44/46
(52) U.S. Cl. .................................. 261/38; 261/DIG. 26; 264/45.9; 264/51; 264/211; 264/211.21; 366/158.5; 366/182.1; 366/192; 366/336; 425/190; 425/4 C; 425/4 R; 521/79; 521/130; 521/133; 521/155
(58) Field of Search .................. 521/79, 130, 133, 521/155; 261/38, DIG. 26; 264/45.9, 51, 211, 211.21; 366/158.5, 182.1, 192, 336; 425/190, 4 C, 4 R

(56) References Cited

U.S. PATENT DOCUMENTS

| 3,865,078 | 2/1975 | De Howitt et al. | 118/612 |
| 5,280,300 | 1/1994 | Fong et al. | 346/1.1 |
| 5,789,457 | * 8/1998 | Eiben et al. | 521/130 |
| 5,844,015 | * 8/1998 | Steilen et al. | 521/155 |

FOREIGN PATENT DOCUMENTS

| 0 011 381 A1 | 5/1980 | (EP) . |
| 0 810 256 A1 | 12/1997 | (EP) . |
| 1 575 049 | 9/1980 | (GB) . |
| 61098517 | 5/1986 | (JP) . |
| WO 96/16782 | 6/1996 | (WO) . |
| WO97/02983 | 1/1997 | (WO) . |
| WO97/47453 | 12/1997 | (WO) . |

OTHER PUBLICATIONS

A. Fischer et al., "Pulvermetallurgische Bauelemente in der Varfahrenstechnik", Chem. Ing. Tech. vol. 62 (1990) No. 4, pp. 263–270.

* cited by examiner

Primary Examiner—John M. Cooney, Jr.

(57) ABSTRACT

A process and apparatus for producing a polymeric foam, wherein foam components are brought together under pressure and are passed through a permeable discharge head where the pressure is reduced. The permeable discharge head comprises a diffuser element having a structure such as to require division, divergence and convergence of flow paths in three dimensions within its axial thickness, considered in the direction of flow therethrough. The diffuser element comprises plural individual woven wire meshes sintered together to form a composite element. The invention also provides the diffuser element.

30 Claims, 12 Drawing Sheets

APPARATUS AND PROCESS FOR PRODUCING POLYMERIC FOAM

The present invention relates to an apparatus and process for producing polymeric foam an din particular, but not exclusively, to an apparatus and process for the continuous production of polymeric foam.

The preparation of polymeric foams conventionally requires the homogenous mixing of several components which react to form a foamed polymer. Typically, the components include a polyol, an isocyanate, a catalyst or catalysts, a surfactant, activators and water. When these components are mixed together in the correct proportions, the water reacts with the isocyanate to produce carbon dioxide for expansion of the polymer.

By discharging a layer of the mixture onto a moving conveyor (with a movable base and with adjustable opposed side walls) the components of the mixture react and continuously produce a polymeric foam block.

More recently, the continuous production of low density foams has involved the use of a relatively inert, low boiling point liquid which is mixed under pressure in a liquid state with the other chemical components in order to provide an auxiliary blowing/frothing action on the mixture before the mixture expands by production of carbon dioxide from the isocyanate/water reaction. The mixture is discharged onto the conveyor and the vaporised low boiling point liquid expands the reaction mixture which then subsequently expands by the chemical production of carbon dioxide from the reaction mixture to form a polymeric foam.

Previously, suitable blowing/frothing agents have included various chlorofluorocarbons (CFCs). Although CFCs have the desired inertness and relatively low boiling point, their use has recently been discouraged on environmental considerations since it is believed that CFCs contribute to depletion of the ozone layer. A suitable replacement for CFCs is carbon dioxide but, since carbon dioxide vaporises at a much lower temperature than CFCs, and indeed must be pressurised in order to exist as a liquid, relatively high pressures have had to be maintained throughout the apparatus and method.

However, unless the vaporisation of the carbon dioxide occurs under controlled conditions, some of it can be lost and the efficiency of the foam expansion is reduced and poor quality foam may be produced, with non-uniform cell structure and voids or "pin-holes".

The apparatus described in EP-A-0645226 attempts to discharge the reaction mixture under controlled conditions by discharging the mixture through an elongate pressure-drop zone to initiate frothing, flowing the frothing mixture along a frothing cavity and through an outlet aperture and subsequently discharging the frothing mixture onto a substrate.

In published WO96/00644, it is proposed to expand a foamable reactive mixture into a large number of individual flows at shear rates of above 500/sec. This is sought to be achieved by passing the reactive mixture through one or more separate fine meshed screens having a screen size from 0.025 to 0.3 mm. The "screens" envisaged in WO96/00644 comprise apertured discs or nets, ie. having simple direct paths therethrough. The various embodiments shown by way of example in WO96/00644 all use separate, multiple fine-meshed screens which are held apart axially by respective spacers so as to have a clear space there between. This appears to have a likely disadvantage that, due to the individual pressure drops across these screens, some frothing could take place in the spaces between the screens which would be highly undesirable in practice. A further disadvantage is that the fine mesh screens can only permit a limited pressure drop without deformation or damage to the screen.

In published WO-A-9616782, it is proposed that a reactive mixture containing carbon dioxide dissolved under pressure should be expanded suddenly so as to produce high rates of shear in the mixture. This is to be achieved by passing the mixture through at least one opening extending to less than 1 mm in at least one direction. The at least one opening can be a fine-mesh sieve, a perforated plate, a slotted grid or an extended slit. A further perforated plate, acting as a stabilizing sieve can be placed downstream of the aforementioned at least one opening. Thus, it is known from WO-A-9616782 to provide a permeable discharge head for use in the production of polymeric foams, through which a reaction mixture is discharged with a controlled pressure drop for formation of a froth, the discharge head comprising plural individual meshes.

UK 1 575 049 is concerned with filter mediums for removing contaminants from molten polymers in the formation of synthetic fibres. It proposes a filter medium structure wherein layers of sintered metal fibres are disposed upstream and downstream of a woven screen member. However, this patent is not concerned with the production of such foams from their constituent reactive chemicals and it does not propose to use the filter medium for the purpose of controlling the pressure drop at a discharge head for the production of such polymeric foams.

The method and apparatus proposed in WO96/02377 are similar to those of WO96/00644 but use a "screening stack" (Siebpackung) to repeatedly divide a reactive mixture into a plurality of individual flows whilst impressing multi-alternating shear rates with maximum values of at least 200/sec. The "screen packing" of WO96/02377 is constituted by a "granular mass" of regular or irregular organic or inorganic filling bodies, with the preferred filling bodies being spheres WO96/00644 also mentions that the "screen packing" might comprise sintered metal plates or sintered glass plates, ie plates made of sintered metal or glass particles. The disadvantages of sintered particle plates are discussed herein, after example 7.

The "reactive mixture" which is used in the techniques disclosed and claimed in both WO96/00644 and WO96/02377 is obtained, using at least two reactive components and carbon dioxide as expanding agent, by mixing at least one of the reactive components with carbon dioxide under pressure, thereby producing a mixture containing liquid carbon dioxide, and subsequently mixing the resultant mixture with the other reactive components to form the foamable reactive mixture. The latter sequential mixing steps are typically carried out in a conventional static mixer and a rotary mixing head, respectively. As is well known conventional "static mixers" incorporate a plurality of angled vanes disposed within an internal chamber such as to promote turbulence and mixing of component fluids passed therethrough.

Thus, the method and apparatus of EP-0645226, WO96/00644 and WO96/02377 are all based on a three step process of:
(1) premixing under pressure at least one of the reactants and liquid $CO_2$;
(2) mixing the component containing the carbon dioxide with the further reactive components or with the second reactive component under pressure; and then
(3) passing the mixed reactive components containing the $CO_2$ through a pressure reducing device.

The latter systems all rely on having fully mixed "reactive mixtures" upstream of the fine-mesh screen(s) or screen packing, since insufficient or insufficiently uniform mixing takes place within the screen apertures themselves.

Other processes using liquid $CO_2$ require the addition of a higher than normal quantity of supplementary nucleating gases. We have discovered that using our permeable discharge head described hereinafter largely eliminates these supplementary nucleating gases.

It is an object of the present invention to provide an improved apparatus and process for producing polymeric foam of uniformity high quality.

In accordance with a first aspect of the present invention, there is provided an apparatus for producing a polymeric foam, wherein foam components are brought together under pressure and are passed through a permeable discharge head where the pressure is reduced, the permeable discharge head comprising plural individual woven wire meshes sintered together to form a composite element, preferably of permeability coefficient between $1 \times 10^{-6}$ and $200 \times 10^{-6}$ (c.g.s units).

Advantageously, the component element has substantially uniform pore size and tortuosity.

The invention also provides a permeable discharge head for use in the production of polymeric foams, comprising plural individual woven wire meshes sintered together to form a composite element, preferably of permeability coefficient between $1 \times 10^{-6}$ and $200 \times 10^{-6}$ c.g.s. units.

Utilising a discharge head of the present characteristics enables the pressure energy contained in the foam components to be used, uniformly throughout the flow cross-section of the composite element, to obtain mixing of the foam components in their passage through the composite element, as well as to promote nucleation, whereby to render premixing upstream of the discharge head, for example using a conventional static and/or rotary mixer, to be unnecessary.

In accordance with a second aspect of the present invention, there is provided a process for producing a polymeric foam from foam components, wherein the foam components are brought together under pressure and, without premixing, are passed through a permeable discharge head wherein the pressure is reduced and downstream of which a froth is formed, the permeable discharge head comprising plural individual woven wire meshes sintered together to form a composite element of permeability coefficient between $1 \times 10^{-6}$ and $200 \times 10^{-6}$ (c.g.s units) having substantially uniform pore size and tortuosity so as to convert pressure energy contained in the pressurised foam components uniformly throughout its flow cross section into mixing and promotion of nucleation, whereby a homogenous frothing mixture is formed at the discharge side of the composite element.

Preferably, the thickness of the composite element lies in the range 0.4 to 5 mm.

The individual woven wire meshes forming the composite element can have the same or different pore sizes.

Some preferred embodiments of the composite element comprise two or more dutch weave meshes.

Other preferred embodiments of the composite element comprise two or more plain dutch weaves and at least one plain weave mesh.

In some embodiments, the apparatus can include a common manifold coupled to the permeable discharge head and into which all components of the foam are fed under pressure. Preferably, the common manifold is coupled to the discharge head by way of a pressure control valve.

Advantageously, the permeable discharge head comprises a single said composite element which is arranged to be sufficiently strong to permit the required pressure reduction in a single pass therethrough.

Also advantageously, the output mixture from the permeable discharge head is deposited onto a transverse plate which lies at an angle between 20° and 70° to the horizontal.

It is preferred that the cross-sectional area, pore size and permeability coefficient of the composite element are selected to maintain a back-pressure before the composite element in the range 0.5 to 80 bar.

In accordance with a further aspect of the present invention, there is provided a process for producing a polymeric foam, wherein foam components are brought together under pressure and are passed through a permeable discharge head wherein the pressure is reduced, the permeable discharge head comprising plural individual woven wire meshes sintered together to form a composite element of permeability coefficient between $1 \times 10^{-6}$ and $200 \times 10^{-6}$ (c.g.s units).

In some embodiments, a surfactant, and a $CO_2$ frothing agent are brought together under pressure upstream of the permeable discharge head, the surfactant being introduced into one of the reactive components before the $CO_2$.

In other embodiments, reactive foam components and an auxiliary frothing agent are brought together under pressure and without premixing, are passed through the permeable discharge head.

Preferably, the auxiliary frothing agent is liquid or gaseous $CO_2$.

In still other embodiments, no auxiliary frothing agent is used at all, the reactive components being brought together under pressure and, without premixing, being passed through the permeable discharge head.

In some embodiments the reactive components and, where present, the auxiliary frothing agent, are brought together in a common manifold.

Advantageously, the velocity of the froth, at exit from the discharge head is adjusted in accordance with the Darcy formula such as to achieve smooth and laminar flow.

For forming foam bodies of circular or substantially circular form, froth exiting from the permeable discharge head can be formed into a body of froth which can be expanded so as to have a substantially circular cross-section.

Unlike the known processes referred to hereinbefore, the process in accordance with the present invention can take place in just two steps, preferably by feeding all of the reactive agents, catalysts, activators and $CO_2$ into a manifold wherein a surfactant is introduced before the $CO_2$. The components are then passed through the present permeable discharge head in the same manner as explained in detail in our earlier application PCT/GB96/01626 in relation to the permeable discharge head of that application, to which reference is hereby directed and the contents of which are incorporated herein by way of reference.

When this arrangement is adopted when using the present permeable discharge head incorporating a diffuser element made of sintered, plural layer, woven wire mesh composite, the conventional necessity for a rotary mixer is obviated and in many cases the use of a static mixer can also be obviated.

As demonstrated by practical examples described hereinafter, the use of the present permeable discharge head can enable high quality polymeric foams to be obtained without the use of $CO_2$ and rotary mixers at all.

The present discharge head enables the provision of a very controlled pressure drop and thereby enables the production of uniformly high quality foam having an improved cell structure.

The sintered woven wire mesh composite used in all of the foregoing aspects of the present invention repeatedly mixes the flows as they pass through the single composite element or elements. Advantageously, the pressure energy in the reactants is used to give homogenous mixing in passing through the tortuous three dimensional path of the permeable element.

A preferred sintered mesh composite comprises a combination of two plain dutch weave meshes with a plain mesh therebetween.

It has been found that thin composite elements in the thickness range 0.4 mm to 5.0 mm are desirable because this largely eliminates frothing during the passage through the elements (causing voids in the final foam). The method of achieving the necessary degree of mixing/tortuosity is by the lamination and sintering together of multiple layers of particular types of woven wire mesh.

The diffuser element should preferably exhibit combinations of the following distinct characteristics: pore size control, uniformity of permeability, mixing/tortuosity, strength and substantial freedom from blocking.

Pore size control can be readily and accurately provided by a plain weave, ie. a weave of equal diameter wires in both warp and weft and woven into an essentially "square" pattern. A single such mesh would provide good division into the requisite number of flows. However, it would usually be unsatisfactory for the present purposes because it would not give the mixing/tortuosity that is required and it could have a too high permeability. A balance between flow rate, pore size, viscosity and pressure drop would therefore not be attainable for the production of good foams without pre-mixing.

Other types of weave have been found useful, used either in conjunction with each other or in conjunction with a plain weave in order to give the characteristics required to produce good foam.

One suitable weave is the plain dutch weave in which the wires in one direction are substantially larger than the wires used at right angles. The characteristic of this weave is that the larger wire remains straight and true whilst the smaller wire weaves over and under the larger wire. The plain dutch weave provides a much more tortuous flow path than the plain weave because the entry flow through a rectangular orifice is subdivided to pass at 90° through two smaller triangular (or skewed triangular) orifices before passing again at 90° through a rectangular discharge orifice, all within a thickness of the single mesh.

A further variation in weave pattern is the twilled dutch weave in which the smaller wires pass under and over two of the large wires. This weave provides an even more tortuous path with consequently more mixing.

There are many other variations on weave pattern which can be used, such as twilled dutch double weave which is a very densely woven pattern.

It has been found that in order to produce good results in the production of foams, a sintered combination of various types of woven wire weaves is usually necessary.

Four of the characteristics defined earlier can be obtained as follows:

1. Pore Size Control

Pore size control can be provided, for example, either by the inclusion of a plain weave layer in the sintered composite or by selection of suitable dutch weave layers. In practice, it is normally found that the inclusion of a plain weave mesh provides a uniform control over pore size. It is preferable that this type of weave is sintered with other types of weave.

2. Mixing Tortuosity

The plain weave alone does not usually give either adequate mixing or tortuosity. This can be provided by the inclusion of a dutch weave layer (which also includes all variations on the dutch weave).

The tortuosity can be provided as described earlier by the necessity of the flow to change direction. This whole process may be repeated multiple times depending upon the number and type of dutch weave layers incorporated into the sintered composite.

3. Rigidity

It has been found that there is advantage in relation to the quality of the resulting foam for the composite sintered elements to be thin and to have a total thickness between 0.4 and 5 mm, preferably between 0.5 and 3 mm. The effective area (i.e. the diameter if the device is round) will be relatively large in order to provide the necessary flow characteristics. This requires that the device has very high strength and rigidity for such a thin sheet.

The rigidity can be provided by the design aspects, the selection of weaves, the orientation of successive laminations within the sintered composite and the final processing of the sintered composite.

By incorporating the dutch weave mesh, large stiff wires are provided with a much greater rigidity than plain weave mesh. Use of a dutch weave with a high wire diameter ratio, increases the rigidity still further. When these meshes are sintered together with the large diameter wires at 90° to each other in adjacent layers, the rigidity in all planes is greatly increased. The overall strength of the composite is improved by placing dutch weave meshes at the outer skins of the composite so that the moment of inertia of the composite is increased and the skin stresses (i.e. the highest bending stresses) are carried by the largest wires.

The overall strength can be further improved by forming the composite sinter into a convex dish shape (in the direction of flow) by cold forming. This has the effect of changing the direction of the stresses from being at right angles to the plane of mesh to a more tangential stress of reduced magnitude.

4. Freedom From Blocking

With a sintered woven wire composite there are substantially no blind passages.

This phenomena may be utilised in the construction of the sintered composite by incorporating a suitable sized dutch weave layer before any plain weave layer thus preventing larger particles from blocking the plain weave layer.

The sintered composite provides a system whereby the variation in orifice size over the whole area is controlled within a very narrow range.

A further advantage of this thin sintered woven wire mesh is that little or no frothing takes place within the sinter element. The froth is largely formed after passing through the sinter element. Other devices such as described in WO96/00644 which have multiple screens or WO96/02377 which have a packing thickness between 10 and 400 mm, may permit frothing to take place during the passage through the devices. This could be detrimental to the froth and cause the bubbles within the froth to coalesce, through friction, which in turn can cause holes in the foam.

An important discovery is that the permeability coefficient and thickness of the sintered mesh can be important in producing fine, open cell foam. With a 20 micron sintered mesh of permeability coefficient $54 \times 10^{-6}$ (c.g.s. units) and a diameter of 30 mm and a thickness of 1.32 mm, a fine open cell structured foam was obtained with a pressure drop across the sinter element of 18 bar at a cold flow rate of 23 kg per minute using conventional polyols.

The effective area of any diffuser element can be calculated from a modified Darcy (D'Arcy) formula/equation According to Darcy's equation:

$$A = \frac{v \cdot l \cdot n}{981 \phi \cdot p \cdot t}$$

Where:
V=volume of fluid flowing in ccs in time t seconds
p=pressure drop across element in gms/sq. cm.
A=effective area of element in sq. cm.
n=absolute viscosity in centipoise (or milli Pascal seconds)
l=thickness of element in cms.
φ=permeability co-efficient [i.e. measurement of flow through element in cgs (cm.gm.second) units].

The or each permeable element can if desired be formed into a convex profile (when viewed from the discharge side) over its effective area to increase its strength.

Advantageously, the permeable element is formed into a convex profile having a convex depth to diameter ratio between 1:4 and 1:20.

Advantageously, the permeable element is preformed with a swaged rim at or near its periphery which is engaged by mating shapes in metering rings clamped at either side, thus improving retention of the permeable element against high pressures. The sintered woven wire mesh composite can be subject to pressures of over 13 bar when using liquid $CO_2$, these pressures can deform the disc into a part of a sphere. It has been observed when foaming under certain pressure conditions using a circular diffuser element that there is no stretch in the sinter mesh but the outside diameter is reduced substantially. This does not affect the quality of the foam produced if the seal area is of sufficient size.

As an example of the contraction in diameter of the disc, we observed that when a disc of 75 mm effective diameter and 100 mm outside diameter 1.32 mm thick was deformed into a 10 mm deep spherical dish shape, the outside diameter reduced by 3 mm.

The formation of a spherical dish shape in the sintered mesh device is advantageous to the functioning because it reduces the induced stresses and provides a degree of self-correcting strengthening. This is partly because the direction of the stress changes from being at right angles to the direction of the force to being at an angle more in line with the direction of force, and partly because the material is work hardened due to the deformation process.

Despite the self-correcting strengthening, it would still be possible in cases of extreme pressure, to cause extreme distortion of the sintered mesh device and other safety measures can be adopted to minimise this possibility. A strong cross or bar can be provided integrally within the clamping flange of the device in such a manner that it restricts excessive deformation of the device.

A further measure to increase the inherent resistance to rupture of the device is to provide the composite element with a pre-formed circumferential rim near to the periphery of the device. This rim is produced by a pressed tool during manufacture and when assembled into the device holder it is engaged by mating shapes in the sealing rings. The tendency to a reduction in diameter is therefore resisted by the locking of the sintered device into the sealing rings.

Advantageously, the discharging froth is deflected by a transverse plate set at an angle between 20° and 70° to the conveyor or fall plate surface. We have found that the height of the discharge head above the transverse plate and the velocity of the froth at exit from the discharge head can be important, too low a height and too high a velocity can cause voids towards the bottom of the block. It is desirable to have the froth flow at exit smooth and laminar.

The invention is described further hereinafter, by way of example only, with reference to the accompanying drawings, in which.

Figure 1:
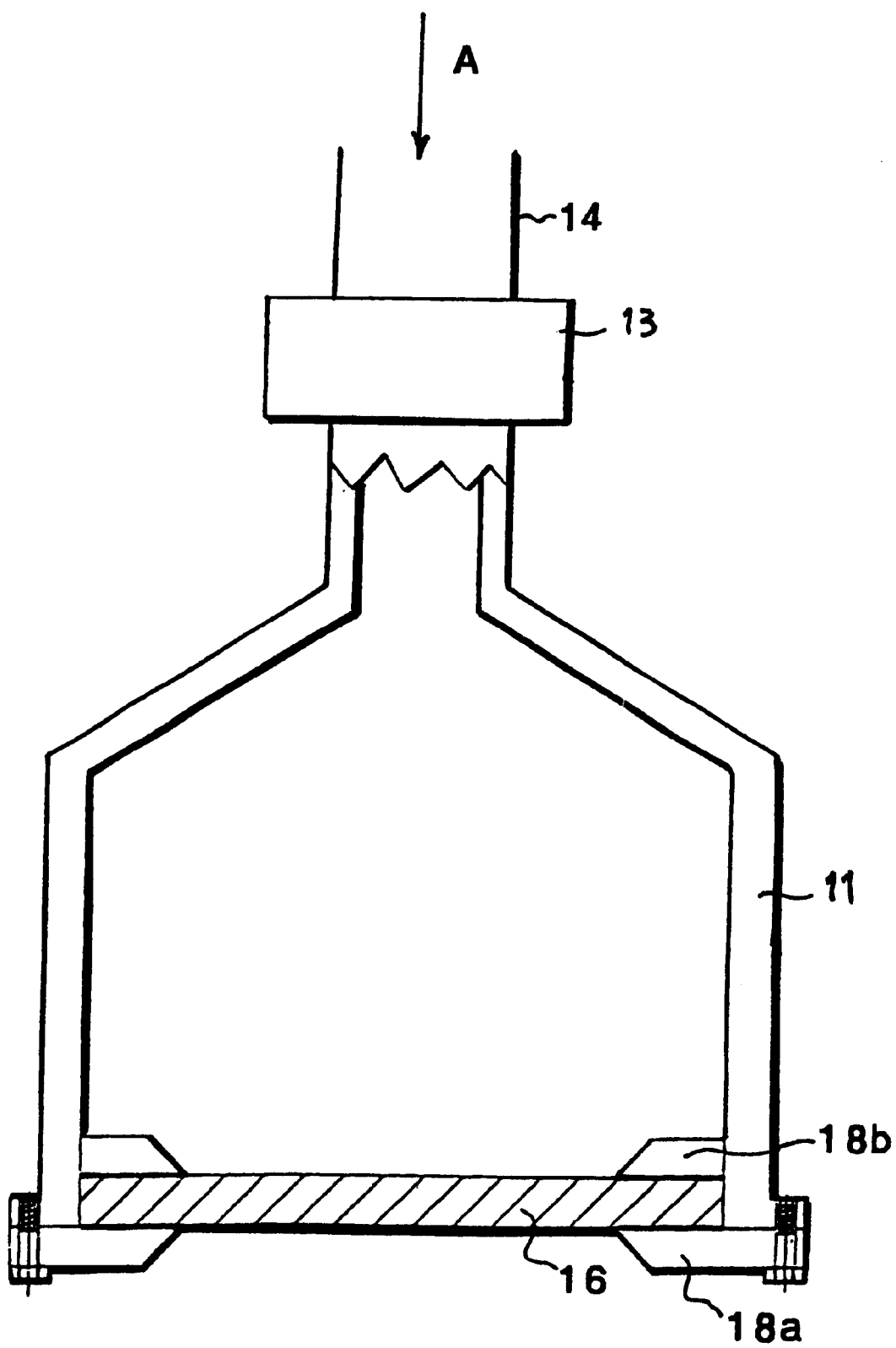
FIG. 1 is a diagrammatic sectional view of one embodiment of a permeable discharge head in accordance with the present invention.

FIG. 1 is a diagrammatic cross-sectional view of one possible permeable discharge head for an apparatus in accordance with the present invention and comprises a generally bell-shaped housing 11 having a coupling 13 at one end for connection to an inlet pipe 14 carrying, in use, the necessary foam components travelling in direction A. Mounted at the downstream, outlet end of the housing 11 is a single composite element 16 constructed of a number of individual disc-shaped woven wire meshes which have been sintered together to form a unitary body which has a structure such as to require division, divergence and convergence of flow paths in three dimensions within its axial thickness, considered in the direction of flow therethrough, whereby to achieve repeated changes of direction and mixing of the flows as they pass through the body. The element 16 is clamped firmly between flanges 18a, 18b, possibly with the addition of circular seals (not shown) to assist in preventing flow of foam components around the periphery of the element 16.

Whereas in the illustrated embodiment the element 16 is circular, in other embodiments it could be of different shapes, eg rectangular.

The present invention is not concerned with the peripheral shape of the element 16 but rather with its structure. As explained hereinbefore, the element 16 is made up of sintered woven wire meshes, normally but not necessarily of metal.

Although the invention is not limited to the use of such weaves. FIGS. 2–5 shows examples of dutch weave meshes for use in forming the composite element 16.

Figure 3:
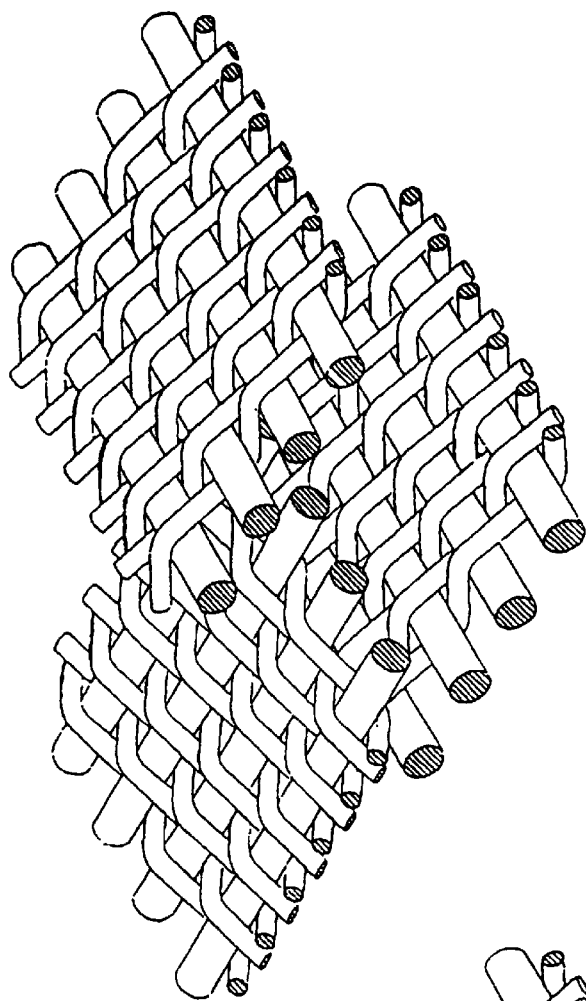
FIGS. 2–5 show examples of dutch weaves for use in the present invention.
Figure 2:
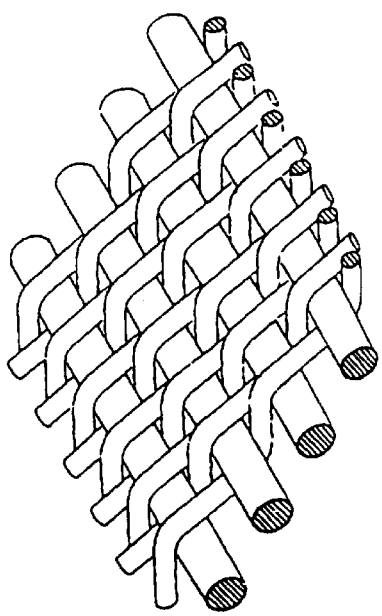
Figure 4:
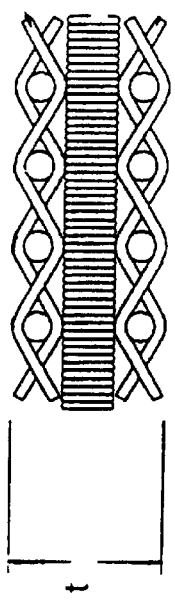

FIG. 2 shows a single layer of plain dutch weave. FIG. 3 shows three layers of plain dutch weave with adjacent layers oriented at 90°. FIG. 4 is an end view of the assembly of FIG. 3. The assembly of FIGS. 3 and 4 has a composite thickness "t".

Figure 5:
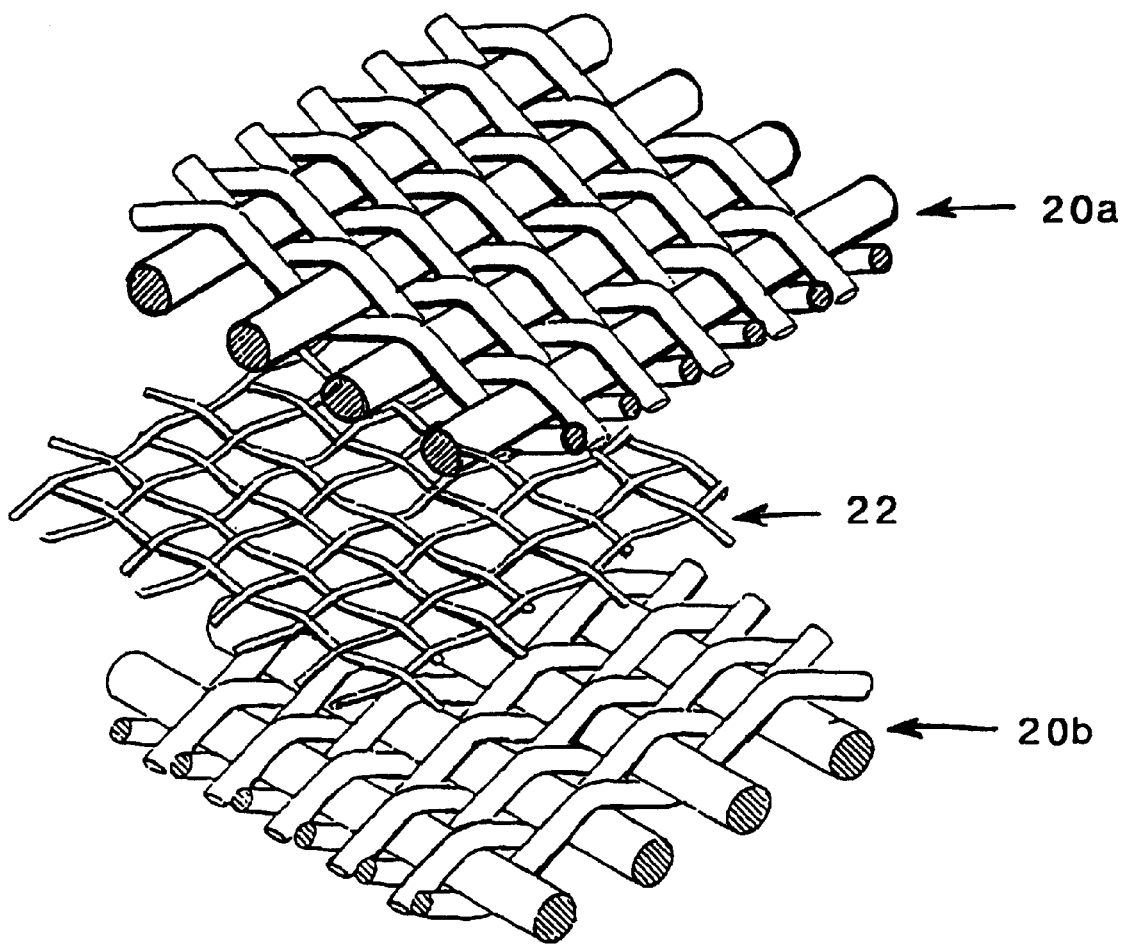

FIG. 5 shows a preferred arrangement for forming the composite element 16 which comprises two plain dutch weave outers 20a, 20b oriented at 90° to each other, and a plain weave inner 22. In the plain dutch weave 20a, the larger wires run East-West, as viewed. In the plain dutch weave 20b, the larger wires run North-South.

An inherent characteristic of sintered woven wire mesh composite as used herein is that it can be designed and manufactured to give a wide range of permeability at a constant pore size rating. This characteristic cannot be achieved using sintered plates produced from particles.

For example, a sintered woven wire mesh composite can be produced with a designated 20 micron plain weave, sandwiched between two coarse outer layers of plain dutch weave. This would produce a designated 20 micron pore size with a suitable permeability. If, instead of the plain weave sandwich, the composite was made from three layers of plain dutch weave of designated 20 micron rating, then a much lower permeability would result. By similar changes to the specification, it is possible to produce a wide range of permeability versus pore size combinations which allows the exact selection of a suitable permeable discharge head for a wide range of chemical formulations and systems.

The advantage of the use of sintered woven wire mesh composite applies to the mixing/tortuosity if the system. By incorporating plain weaves, the tortuosity is reduced and by incorporating dutch weaves (and variations such as twilled and reverse dutch weaves) the tortuosity is increased.

Sintered woven wire mesh composites allow the possibility to control permeability, pore size, mixing/tortuosity independently.

Figure 6:
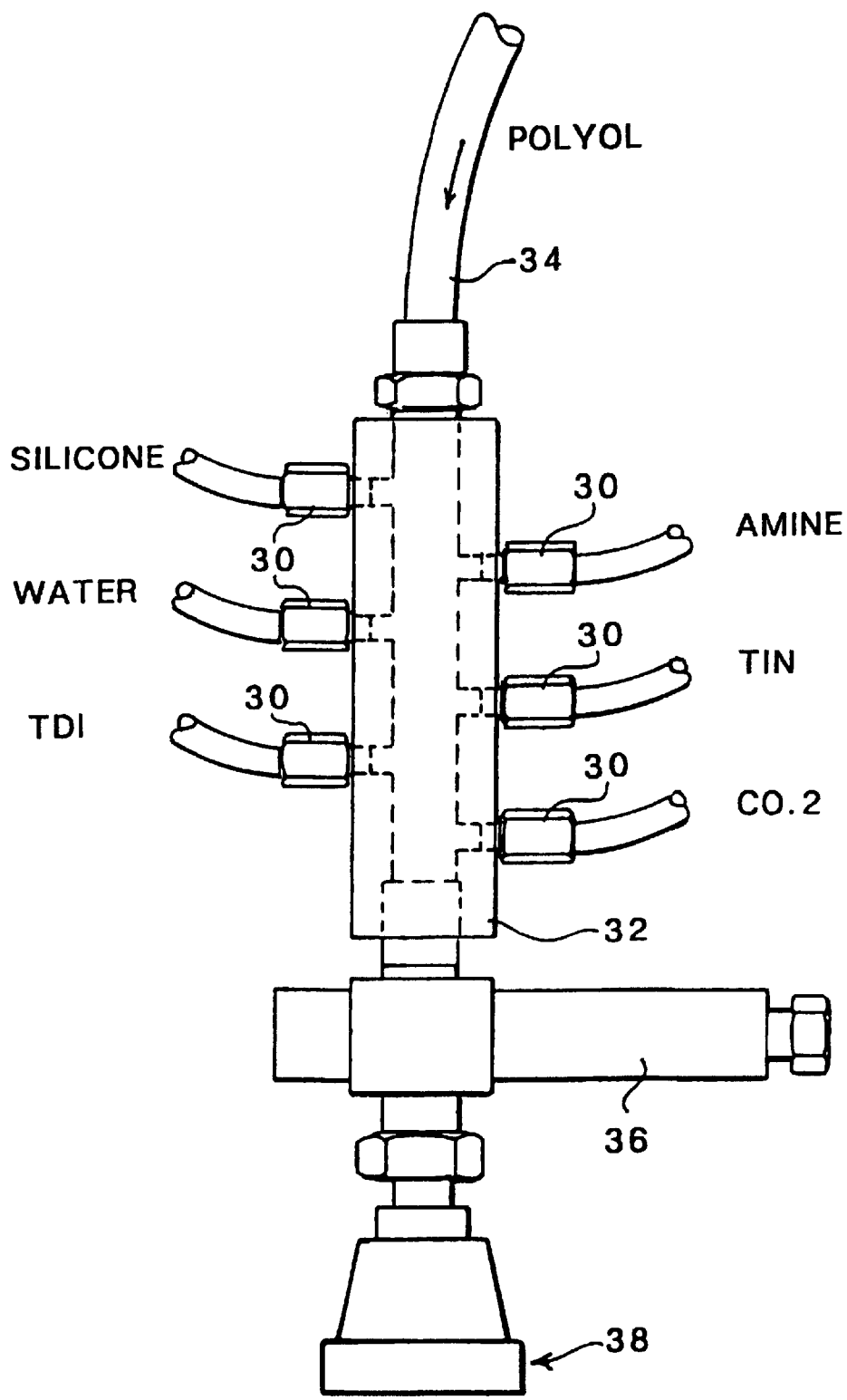
FIG. 6 illustrates in section one embodiment of a chemical inlet manifold and dispense device discharge head for an apparatus in accordance with the present invention.

Referring now to FIG. 6 there is shown an example of a system embodying the present invention wherein the various components, ie, silicone, water, TDI, amine and tin, as well as the blowing/frothing agent ($CO_2$) are simply introduced via respective injection valves/injectors 30 into a hollow common manifold 32 to which the polyol is also supplied via a tube 34. It is preferred for the $CO_2$ to be injected last, ie nearest the output end of the manifold. A pressure control valve 36 between the manifold outlet and a permeable discharge head 38 enables the pressure to be maintained above the equilibrium pressure of the mixture.

The permeable discharge head 38 is constructed along the lines explained in connection with FIG. 1. Further details of possible structures for the discharge head are explained in our earlier Application PCT/GB96/01626 to which reference is hereby directed and the contents of which are incorporated herein by way of reference.

It is well known in the art of foaming that partial mixing can take place by metering the reactive components through injector nozzles, but in the continuous manufacture of polymeric foam, in addition, rotary mixers running at speeds of up to several hundred to over several thousand r.p.m. are normally required to produce foam of suitable cell structure. This present invention enables the use of rotary or static mixers to be avoided as confirmed in examples 3.1 to 3.4 inclusive, described hereinafter.

Figure 7:
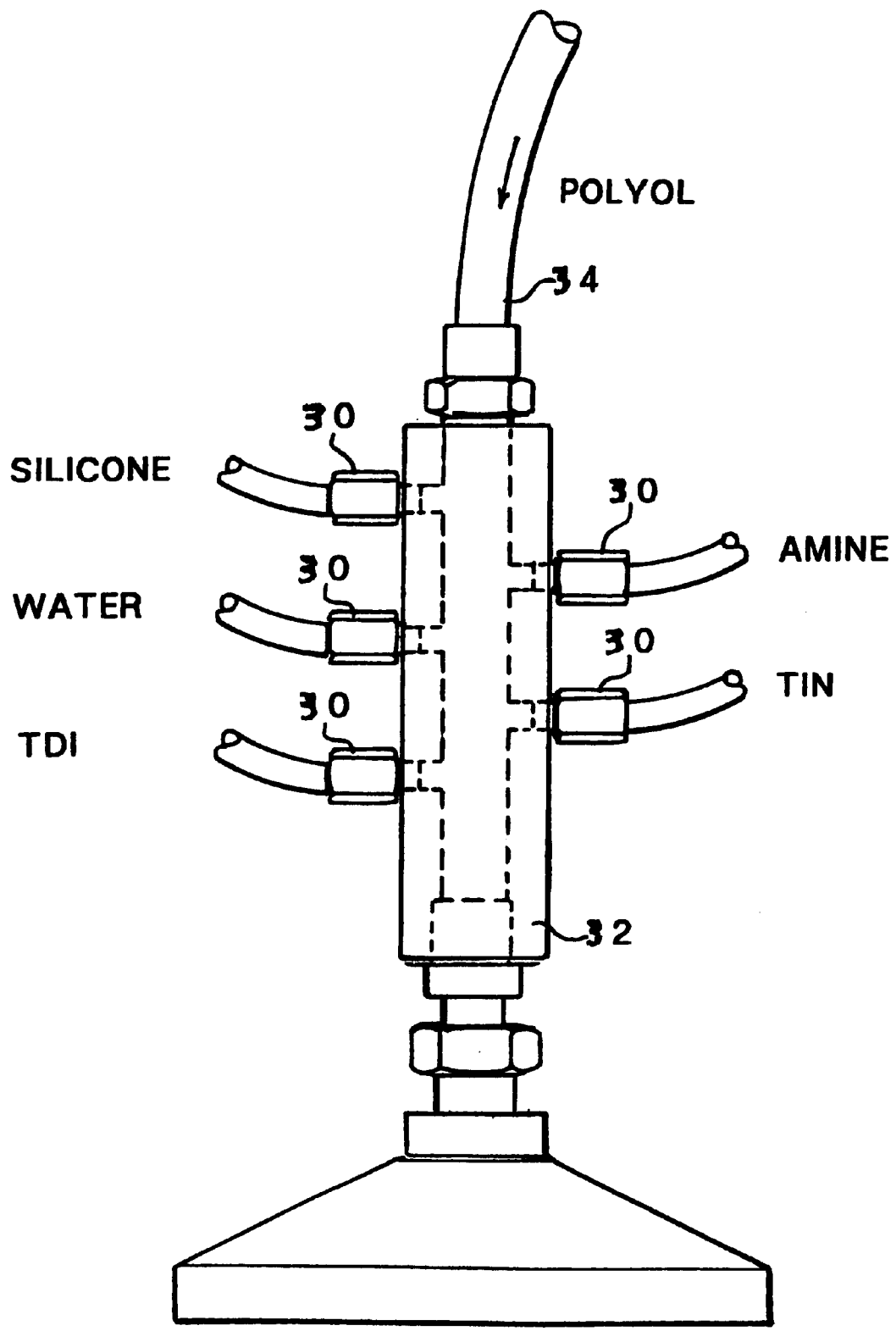
FIG. 7 illustrates in section an embodiment similar to that of FIG. 6 but which excludes altogether the use of a blowing/frothing ($CO_2$) agent.

As also demonstrated further hereinafter, the present invention enables foams to be made without the use of $CO_2$ frothing agent. An example of how the chemical manifold 12 would be modified if there is no $CO_2$ input, is shown in FIG. 7.

It has been found advantageous to use nucleating gases such as air or nitrogen when foaming without $CO_2$.

Figure 10:
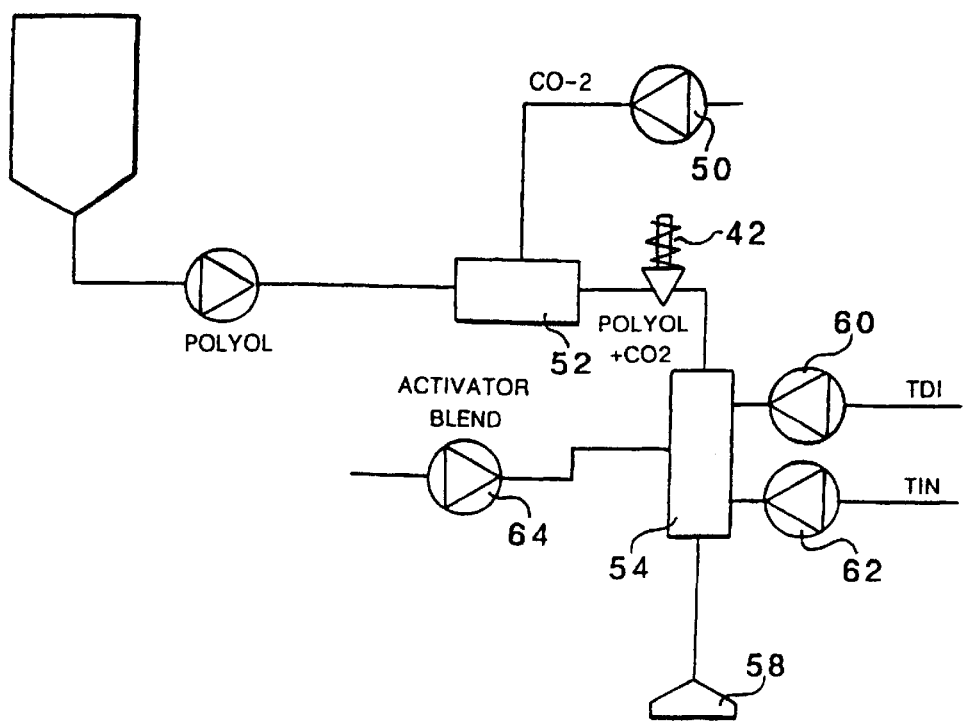
FIG. 10 shows an apparatus which is not preferred in the application of the present invention wherein the $CO_2$ is introduced before the activator and catalyst components (including the silicone catalyst)

Referring now to FIG. 10 there is shown an apparatus which is not preferred in the application of the present invention since the $CO_2$ is introduced before the activator and catalyst components (including the silicone and catalyst) and which has been found to give unsatisfactory results when used to make $CO_2$ blown foams. The reason why this circuit gives poor results is believed to be that the silicone is not present in one of the reactive components at the time the $CO_2$ is introduced.

FIGS. 11 to 18 show embodiments which are preferred arrangements embodying the invention.

Figure 11:
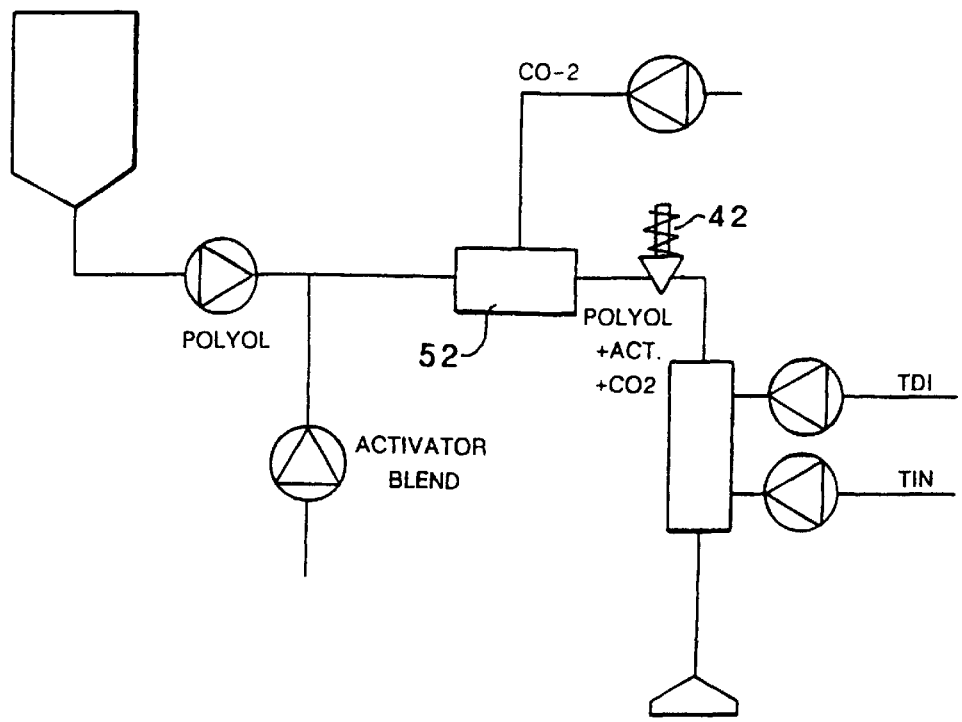
FIGS. 11 to 18 show embodiments of apparatus which are preferred within the present invention.

FIG. 11 is similar to FIG. 10 but with the important difference that the silicone is already introduced into the polyol at the time when the $CO_2$ is introduced. Using this circuit it has been found that when using conventional polyurethane chemical systems, additional mixing is unnecessary when used in conjunction with the present permeable discharge head.

Figure 12:
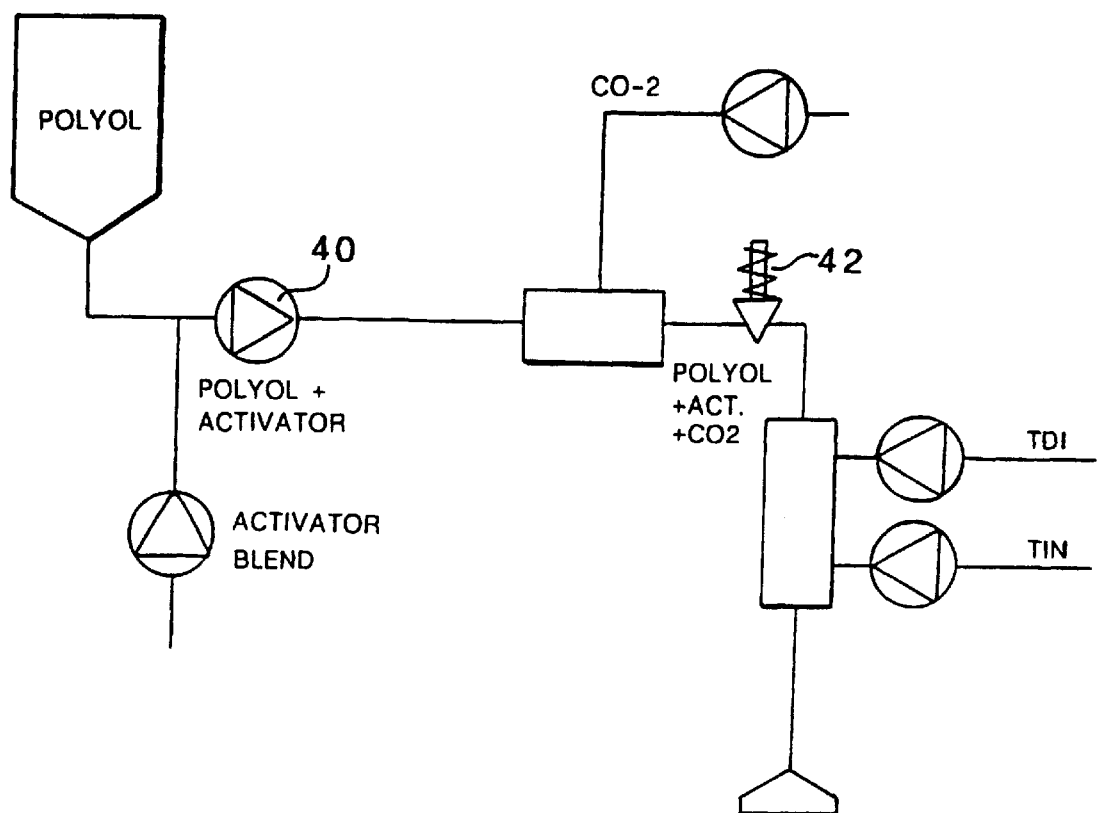

In the apparatus of FIG. 12, the pump 40 not only meters exact amounts of the polyol or polyol blend but increases the pressure to approximately 60 bar in order to allow the $CO_2$ to be introduced at high pressure without vaporisation. In some practical applications, it is advantageous to meter the activator at low pressure (approx 2 to 10 bar) and this can be achieved by introducing the activators prior to the high pressure pump.

Figure 13:
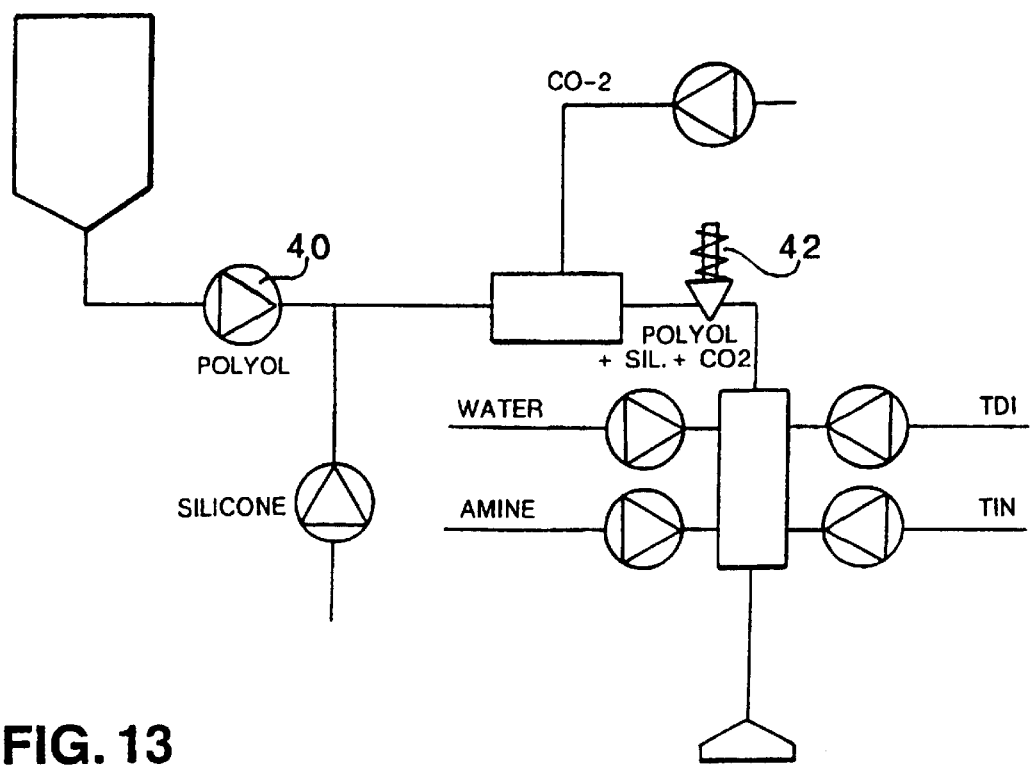
Figure 14:
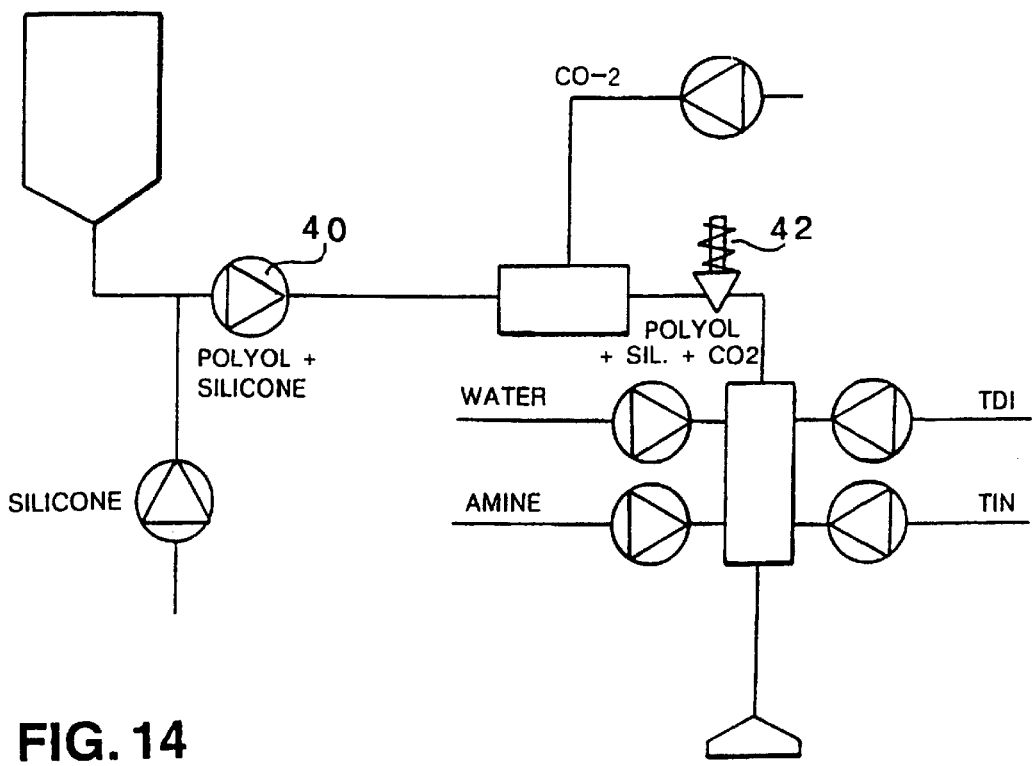

FIGS. 13 and 14 are similar to FIG. 12 except that it is shown that the important chemical to introduce before the $CO_2$ is the surfactant, the other activators such as amine, water and tin may be introduced after the $CO_2$ with no detrimental effects. It is also shown that the silicone may be introduced at high pressure after pump 40 or at lower pressure before pump 40. In this configuration all streams added after the pump 40 are of high pressure and would use injection valves at the point of entry into the main stream.

Figure 15:
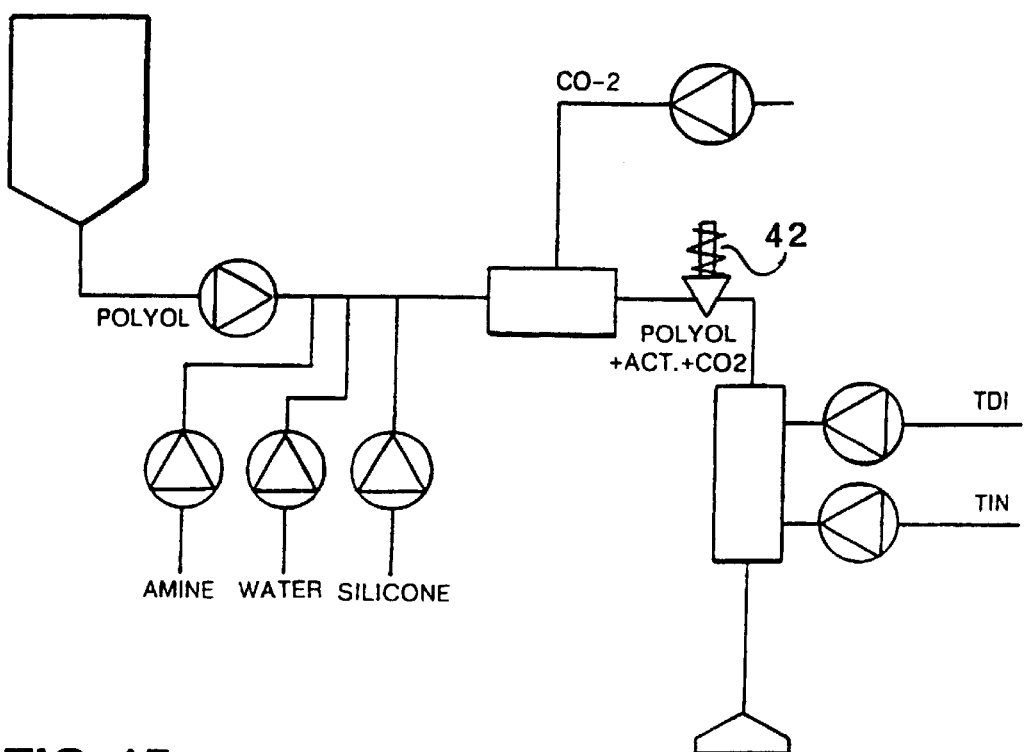
Figure 16:
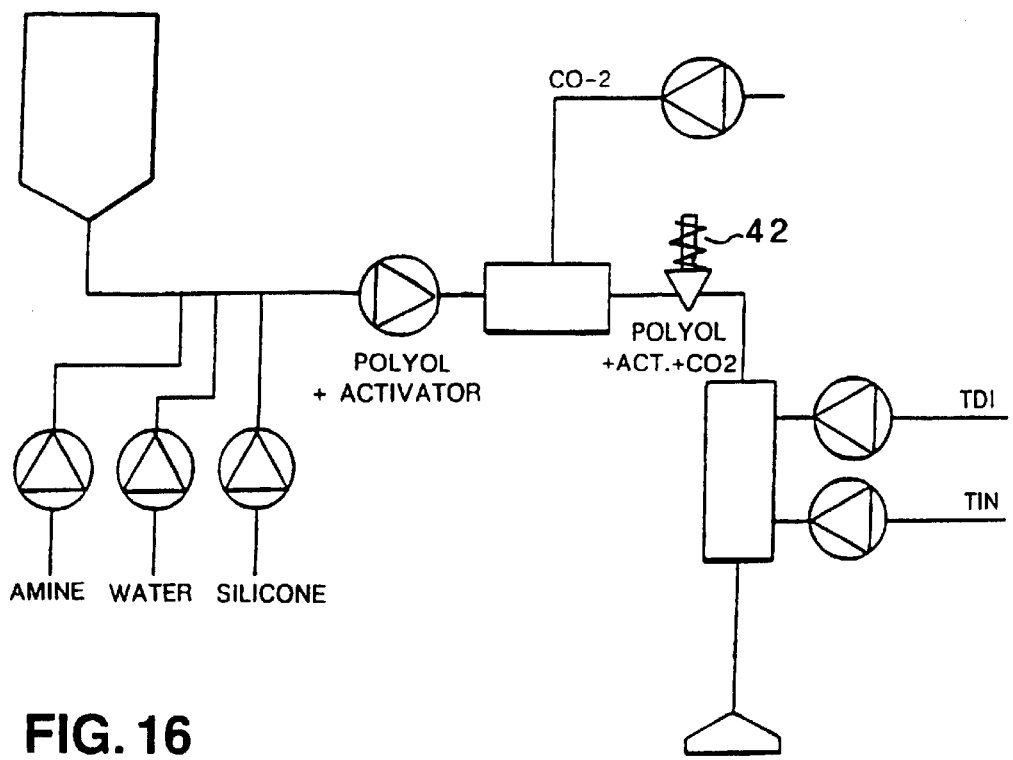

FIGS. 15 and 16 are similar to FIG. 12 except that it is shown that the activator streams may be pumped individually to the circuit as an alternative to preblending them.

Figure 17:
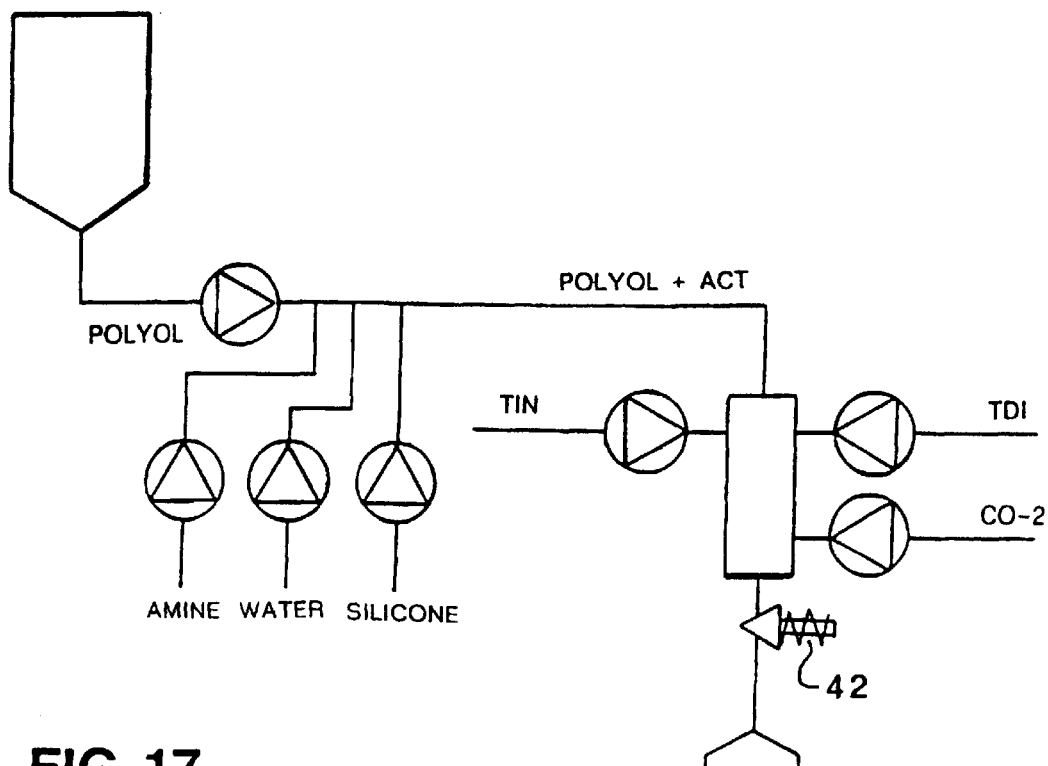
Figure 18:
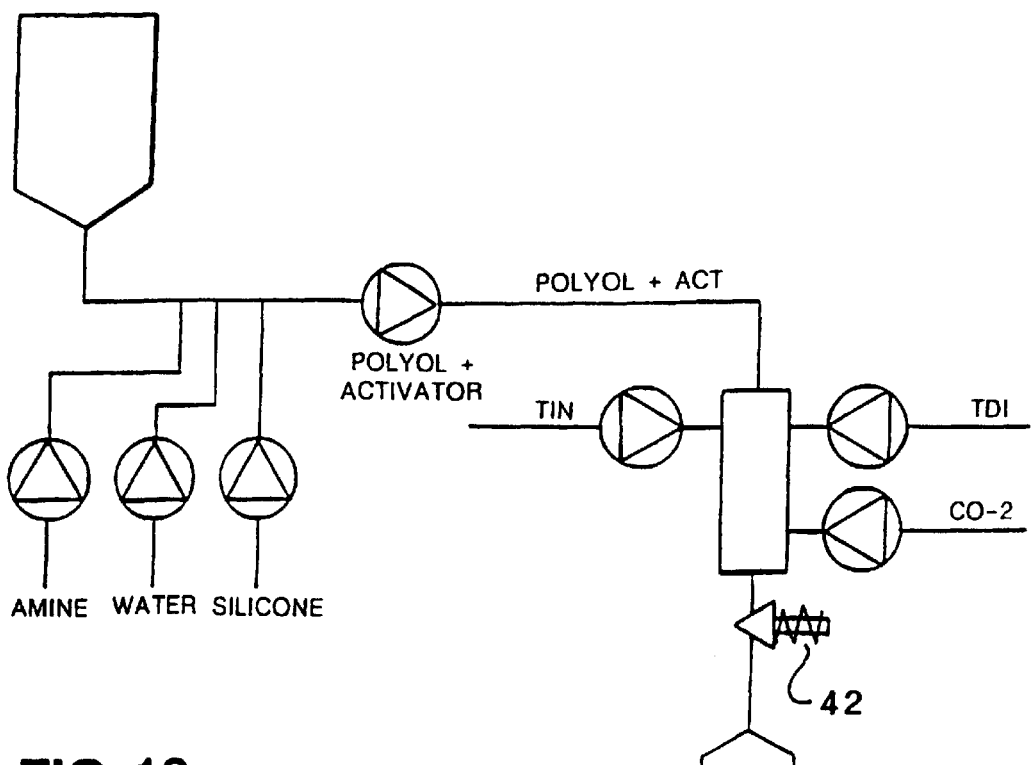

FIGS. 17 and 18 indicate that the principles covered by the preceding Figures may be applied to a system as shown in FIG. 6 in which all streams are introduced before the pressure regulating valve 42.

In all of FIGS. 10 to 18, recirculation systems on all streams which may usually be present in practice have been omitted for clarity.

Examples are now described showing that by the use of a sintered woven wire mesh composite in accordance with the present invention, static and rotary mixers can be eliminated.

EXAMPLE 1

A foam run was conducted with a total output of 23 kg of reactive materials and $CO_2$ based on 100 parts Polyol, 4.5 parts Water, 4.0 parts $CO_2$, TDI Index 110. All the reactants plus $CO_2$ frothing agent were fed into a manifold (bypassing the usual static premixing and rotary mixing processes) feeding the reactants and $CO_2$ through a sintered woven wire mesh composite of micron rating 20 with a diameter of 30 mm. Good fine open cell structure foam was made of density 15.6 kg per cubic meter.

EXAMPLE 2

A foam run was conducted at a total output of 122 kilograms per minute of reactants and $CO_2$ based on 100 parts Polyol, TDI Index 112, Water 4.5 parts, $CO_2$ 4 parts. The reactants and $CO_2$ were fed through a 20 micron rates sintered woven mesh wire composite. The foam produced was fine open cell with block dimensions, height 1.0 m width 2.1 m and a density of 16 kg per cubic meter.

After 20 minutes of foam production the rotary mixer was run at 500 r.p.m. Immediately, top splits were produced in the block. After 23 minutes the mixer was turned off and the top splits disappeared and again a good fine open cell foam was produced.

A major problem with the manufacture of flexible polyurethane foam is the presence of voids (pea holes) and pin holes in the foam. These defects are particularly prevalent in the manufacture of foam by the well known Maxfoam or Vertifoam processes. The mixing produced by the present sintered woven wire mesh composite overcomes these problems.

EXAMPLE 3

Four foams were produced without $CO_2$

| Rate of foam production | 9.985 (10 kg) kg per minute |
|---|---|
| Polyol | 100 ppH |
| TDI | Index 110 |
| Water | 4.5 ppH |

Ex. 3.1

The polyol blend (Water, Silicone and Amine) plus Tin, TDI and a nucleating gas nitrogen were fed into the mixing head manifold without the stirrer running with a sintered woven wire mesh composite of 20 micron rating. The foam produced had a fine regular structure without pin holes.

Ex. 3.2

As 3.1 but with the stirrer running at 300 r.p.m., the foam produced had a fine regular cell structure but contained pea holes and several vertical holes (chimneys). This was attributed to the use of the stirrer, causing cavitation and the formation of bubbles in the mixed reactants.

Ex. 3.3

The sinter mesh was removed and the mixer was stopped. The foam produced had major splits, unmixed areas, pea holes and generally poor quality. Thus, the manifold and injection of the foam chemicals did not in itself produce sufficient mixing.

Ex. 3.4

3.3 was repeated with the mixing head running at 3000 r.p.m. The resulting foam had an irregular cell structure, many pea holes and large splits.

EXAMPLE 4

(Apparatus of FIG. 10)

A foam was made at a total output of 22.4 kilo-minute from

| Polyol | 100 ppH |
|---|---|
| Water | 4.5 ppH |
| Silicone | 1.68 ppH |
| Amine | 0.25 ppH |
| Tin | 0.2 ppH |
| $CO_2$ | 4 ppH |

The Water, Silicone and Amine were preblended into one stream—called the Activator blend.

The polyol and $CO_2$ from pump 50 were fed into a $CO_2$ injector block 52 under pressure, after which they were fed through a pressure regulating valve 42 at a pressure of 40 bar to a manifold 54 and hence to the discharge/dispensing head 58.

The TDI from pump 60, Tin from pump 62 and Activator blend from pump 64 were fed at high pressure into the same manifold. The reactants including $CO_2$ and Activator blend were then fed to the pressure reduction device discharge head 58. The foam produced was of poor quality, full of holes and with many surface defects.

EXAMPLE 5

(Apparatus of FIG. 11)

The above test was repeated but the Activator blend was fed into the Polyol before it was fed into the $CO_2$ injector block 52. The resultant foam was good and free from holes and had no surface defects.

EXAMPLE 6

(Apparatus of FIG. 12)

A foam was made at an output of 218 kg per minute from the following formulation:

| Polyol | 100 ppH |
|---|---|
| TDI Index | 104 |
| Water | 4.13 |
| Tin | 0.25 |
| Silicone | 1.5 |
| Amine | 0.164 |
| $CO_2$ | 4.0 |

Each of the Activator/Catalyst streams was metered separately, with the Silicone injected as a separate stream onto the Polyol before it was fed into the $CO_2$ injector block. The resultant foam was good, free from holes and had no surface defects.

These tests show that by injecting the Silicone into the Polyol before the addition of $CO_2$ and using the present woven sintered wire mesh gives a good foam without the use of rotary mixing heads.

EXAMPLE 7

One test used a sintered metal plate of average pore size rated at 50 micron (the quoted range of pore size by the supplied manufacturer was from 15 to 250 micron). A foam was made using this material under the following conditions;

| Polyol | 100 |
|---|---|
| TDI Index | 110 |
| Water | 3.8 |
| $CO_2$ | 2.4 ppH |

The pressure of the reactants and $CO_2$ before the entrance to he sintered metal was 20 bar.

The resulting foam has some pea holes and pin holes and was not acceptable.

This test was repeated using a thin sintered woven wire mesh element of 20 micron rating, thickness 1.32 mm, with a pressure before the entrance to the sintered metal of 26 bar. The resulting foam was good and free from voids and pin holes.

a. The aforegoing example 4 describes the results using the apparatus of FIG. 10 and example 5 and example 6 show the results using the apparatus of FIG. 11 and FIG. 12.

b. These tests with no $CO_2$ and other work carried out with liquid $CO_2$ confirm that using a sintered woven wire mesh composite gives well mixed foams, free from voids and other defects without the use of rotary mixers for both non $CO_2$ and $CO_2$ foams.

c. Preferably, the $CO_2$ is introduced into the common manifold last, ie into a region of the manifold closest to the manifold outlet to the present permeable discharge head compared to the points of introduction of the various reaction components.

Disadvantages of Sintered Particle Plates

1. Previously mentioned WO96/02377 cites the proposal of granular masses or of sintered metal plates or sintered glass plates (sintered particle plates) as suitable screen "packings" with the narrowest possible through-channels, with cross-sectional surface areas particularly preferably between 0.02 to 0.2 mm$^2$, with the layer thickness in the direction of packing particularly preferably 10 to 400 mm.

2. As now described hereinafter, sintered particle plates have a number of important disadvantages compared to the sintered woven wire mesh composites used in the present invention. For example, there are considerable variations in the cross sectional areas of the orifice passages through the sintered particle plates. In addition, in some cases, migration of the sintered particles can take place to the outside of the packing. These variations can lead to voids and faults within the foam. The problems and practical disadvantages of such sintered materials are illustrated in the following examples.

3. The pore size is governed largely by the size of particle used in the sintering process. Therefore for a given particle size, the permeability can only be controlled by varying the thickness. With sintered woven mesh composites it has been found that optimised foams have been obtained with a thickness between 0.5 and 5 mm, preferably between 0.5 and 3 mm. The use of particle sinters limits the available combinations of pore size and permeability which lie within these thickness limitations. In addition, this limits the flow rates and viscosities which can be successfully processed.

4. We have established that constancy/uniformity of permeability is important in the production of a uniform froth and hence a uniform foam. As permeability is a function of pore size, with sintered particle plates, the uniformity of permeability is difficult to control because of variations in particle size. Sintered particle plates therefore do not give the required constancy/uniformity of permeability.

5. The variation in pore size present in a particle sinter is such that there will be a small quantity of pores which are significantly larger than the mean pore size and (numerically) a large number of pores which are below the mean pore size.

The problems presented by pores which are too large are:
(a) The permeability is increased which lowers the pressure drop which would otherwise apply to the mean pore size.
(b) The larger pores could cause pin holes or pea holes in the final foam product.
(c) a disproportionate percentage of the chemical flow will take the easier route through the larger pores, thus reducing the velocity in the correctly sized pores and increasing the blockage rate due to build up in the pores.

The problems presented by pores which are too small are:
(a) the flow rate through the smaller pores will be very low because there will be insufficient back pressure to give sufficiently high velocity. This will result in premature blockage.
(b) Blockage will occur in small pores due to particles and agglomeration in the chemical flow which would otherwise pass freely.
(c) Because the proportion of the total device area which has smaller pores will not be accepting its proportion of total flow, the flow through the remainder will be increased, accentuating the problem of excessive flow in the larger pores.

6. Blind pores

Some of the pore channels in a randomly distributed particle sinter will have only one opening with no through exit. Other pore channels will exist as cross channels at 90° to the flow direction through which there is no motive force to maintain a velocity. In both cases, the reactive mixture will remain trapped in the sintered device and will expand to form a cured foam particle which will eventually cause blockage of the device.

7. Particle Migration

In a device composed of individual particles sintered together there will be a number of particles which may not be completely secured by fusion to the main body.

Due to the high pressure drop required by the foaming process, some of these free particles will become dislodge and will either trap in other pore channels or will be detached and carried into the final foam product. If they lodge in other channels, it will cause premature blockage and if they are carried outside of the sinter this could cause further variation in permeability.

8. Strength of Bonding

Because each particle is separate and is only attached to the sintered body by fusion, it is possible that weak areas can exist which would be undetectable before use, causing foam defects and waste.

The above disadvantages reduce the duration for which the sintered particle plate can be used.

Figure 8:
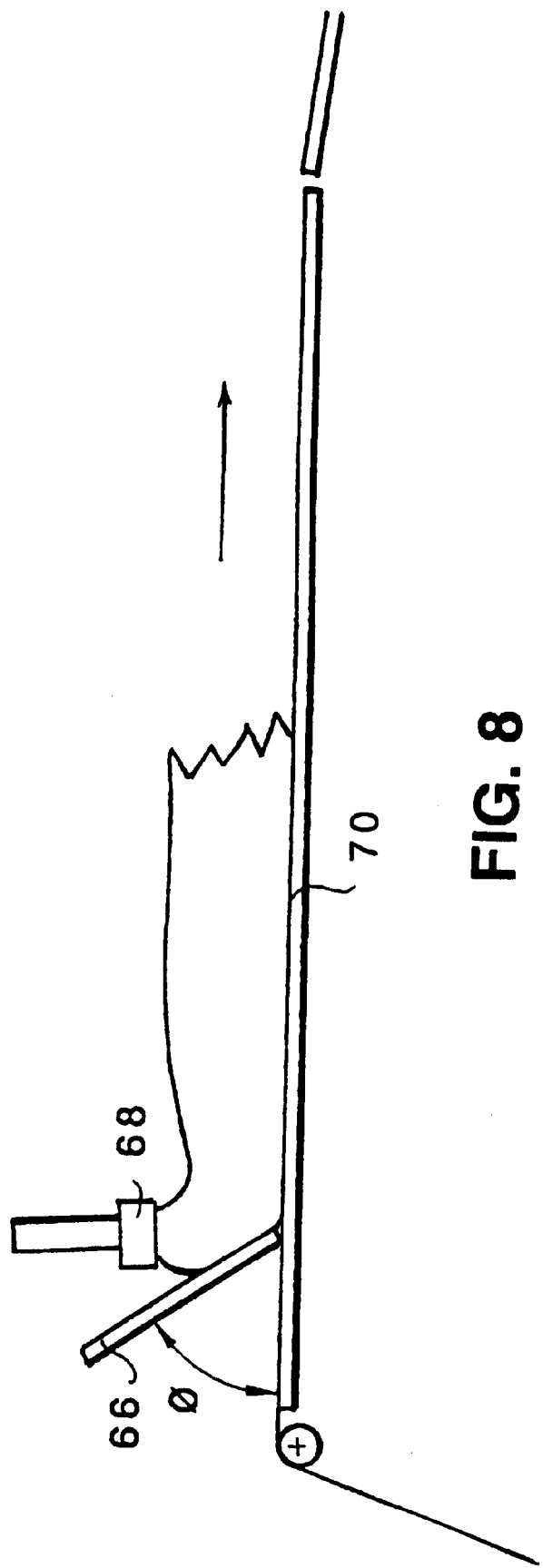
FIGS. 8 and 9 illustrates the use of an angled transverse plate to receive the froth.
Figure 9:
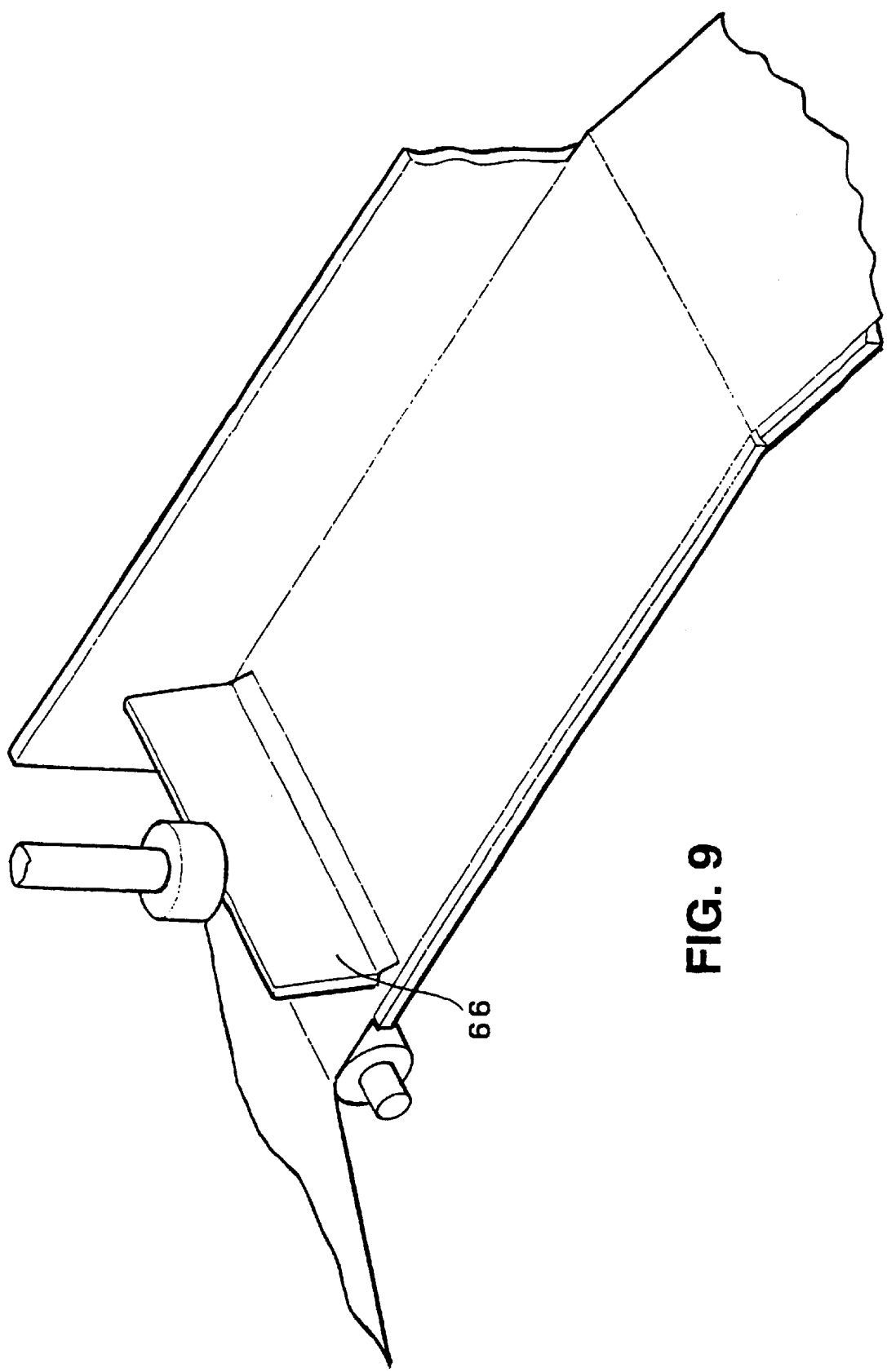

A further discovery we have made is that in laying the froth down onto a Maxfoam fall-plate or conveyor, voids were produced in the bottom of the block. A transverse plate 66 (see FIGS. 8 and 9) was introduced between the exit from the sintered mesh 68 and the fall-plate 70 (or conveyor). It has been found that an angle $\phi$ of the transverse plate between 20° and 70° and preferably between 30° and 50° to the horizontal avoids the formation of voids in the bottom of the block. In addition this transverse plate 66 assists in distributing the foam across the width of the machine.

Blocks of Foam with Non-Rectangular Cross Section

Blocks of foam with circular cross-sectional areas are made using the well known conventional inclined conveyor, Maxfoam and Vertifoam processes. It is very important to avoid pin holes and voids as round blocks are made to be peeled into relatively thin sheets 2 mm to 20 mm thick and such defects would cause foam waste.

In conventional inclined conveyor processes, the reactants are laid down onto the conveyor in the fluid state and great care has to be taken to avoid air trapping or under-running as this can produce voids, pin holes and waste foam. It has been found that the laydown produced using the present permeable discharge head, with and without a liquid $CO_2$, is not as critical and voids, pin holes and other foam defects are considerably reduced.

In the Maxfoam and Vertifoam processes a partially pre-expanded foam is used, but any gasses trapped in the foam prior to laydown give voids and pin holes in the foam. The use of the sintered woven wire mesh composite as defined in this invention avoids the use of rotary mixers and the voids and pin holes produced by the rotary mixer can be avoided.

What is claimed is:

1. A permeable discharge head for use in the production of polymeric foams, through which a reaction mixture is discharged with a controlled pressure drop for formation of a froth, comprising plural individual meshes, characterised in that the permeable discharge head comprises plural individual woven wire meshes sintered together to form a composite diffuser element.

2. A permeable discharge head as claimed in claim 1, wherein the permeability coefficient of the composite element lies between $1 \times 10^{-6}$ and $200 \times 10^{-6}$ (c.g.s. units).

3. An apparatus for producing a polymeric foam, wherein foam components are brought together under pressure and are passed through a permeable discharge head where the pressure is reduced for forming a froth, the permeable discharge head comprising plural individual meshes, characterised in that the permeable discharge head includes a diffuser element comprising plural individual woven wire meshes sintered together to form a composite element which repeatedly mixes the flows as they pass therethrough.

4. An apparatus as claimed in claim 3, wherein the permeability coefficient of the composite element lies between $1\times10^{-6}$ and $200\times10^{-6}$ c.g.s. units.

5. An apparatus as claimed in claim 3 or 4, in which the composite element has substantially uniform pore size and tortuosity.

6. An apparatus as claimed in claim 3 or 4, wherein the thickness of the composite element lies in the range 0.4 to 5 mm.

7. An apparatus as claimed in claim 3, wherein the individual woven wire meshes forming the composite element have the same or different pore sizes.

8. An apparatus as claimed in claim 3, wherein the composite element comprises two or more dutch weave meshes.

9. An apparatus as claimed in claim 3, wherein the composite element comprises two or more plain dutch weave meshes and at least one plain weave mesh.

10. An apparatus as claimed in claim 3, including a common manifold coupled to the discharge head and into which all components of the foam are fed under pressure.

11. An apparatus as claimed in claim 10, wherein the common manifold is coupled to the discharge head by way of a pressure control valve.

12. An apparatus as claimed in claim 3, in which the permeable discharge head comprises a single said composite element which is arranged to be sufficiently strong to permit the required pressure reduction in a single pass therethrough.

13. An apparatus as claimed in claim 3, in which the output mixture from the permeable discharge head is deposited onto a transverse plate which lies at an angle between 20° and 70° to the horizontal.

14. An apparatus as claimed in claim 3, in which the cross-sectional area, pore size and permeability coefficient of the composite element are selected to maintain a backpressure before the composite element in the range 0.5 to 80 bar.

15. A process for producing a polymeric foam, wherein foam components are brought together under pressure and are passed through a permeable discharge head comprising plural individual meshes where the pressure is reduced for forming a froth, characterised in that the discharge head comprises plural individual woven wire meshes sintered together to form a composite element which repeatedly mixes the flows as they pass therethrough.

16. A process as claimed in claim 15, wherein reactive foam components, including a surfactant, and a $CO_2$ frothing agent are brought together under pressure upstream of the permeable discharge head, the surfactant being introduced into one of the reactive components before the $CO_2$.

17. A process as claimed in claim 15, in which reactive foam components and an auxiliary frothing agent are brought together under pressure and, without premixing, are passed through the permeable discharge head.

18. A process as claimed in claim 15 wherein the auxiliary frothing agent is liquid or gaseous $CO_2$.

19. A process as claimed in claim 15, which uses no auxiliary frothing agent, in which the reactive foam components are brought together under pressure and, without pre-mixing, are passed through the permeable discharge head.

20. A process as claimed in any of claims 17 to 19, in which the reactive components and, where present, the auxiliary frothing agent, are brought together in a common manifold.

21. A process as claimed in claim 16, wherein the velocity of the froth at exit from the discharge head is adjusted in accordance with the Darcy formula such as to achieve smooth and laminar flow.

22. A process for the manufacture of polymeric foam as claimed in claim 15, wherein froth exiting from the permeable discharge head is formed into a body of froth having a substantially circular cross-section.

23. A process as claimed in claim 15 for producing a polymeric foam from foam components, wherein the foam components are brought together under pressure and, without premixing, are passed through said permeable discharge head wherein the pressure is reduced and downstream of which the froth is formed, the composite element of the permeable discharge head being of permeability coefficient between $1\times10^{-6}$ and $200\times10^{-6}$ (c.g.s. units) and having substantially uniform pore size and tortuosity so as to convert pressure energy contained in the pressurised foam components uniformly throughout its flow cross-section into mixing and promotion of nucleation, whereby a homogenous frothing mixture is formed at the discharge side of the composite element.

24. A process for producing polymeric foam as claimed in claim 15, wherein all of the reactive foam components and a low-boiling point frothing agent are brought together without pre-mixing using a static mixer or rotary mixer, sufficient pressure is applied to maintain the frothing agent in a liquid state, and the combined reactive foam components and frothing agent are passed through said permeable discharge head through which the mixture is discharged and where the pressure is reduced and froth is formed.

25. A process for producing polymeric foam as claimed in claim 15, without the use of any low-boiling point frothing agent, wherein all of the reactive foam components are brought together, without pre-mixing using a static mixer or rotary mixer, and the combined reactive foam components are passed through said permeable discharge head through which the mixture is discharged and froth is formed.

26. A process for producing polymeric foam as claimed in claim 15, wherein reactive foam components, with or without a low-boiling point frothing agent, are brought together and the mixture is passed through said permeable discharge head through
which the mixture is discharged and where pressure is reduced and froth is formed.

27. A process for producing polymeric foam as claimed in claim 15, wherein reactive foam components and a low-boiling point frothing agent are brought together under sufficient pressure to maintain the frothing agent in a liquid state, and the combination is passed through said permeable discharge head, whose permeability coefficient is arranged to be between $1\times10^{-6}$ and $200\times10^{-6}$ c.g.s units.

28. A permeable discharge head as claimed in claim 1, wherein the composite element is a unitary structure comprising at least two layers of woven wire mesh sintered together.

29. An apparatus as claimed in claim 3, wherein the composite element is a unitary structure comprising at least two layers of woven wire mesh sintered together.

30. A method as claimed in claim 15, wherein the composite element is a unitary structure comprising at least two layers of woven wire mesh sintered together.

* * * * *